United States Patent
Shimizu et al.

(10) Patent No.: US 10,059,324 B2
(45) Date of Patent: Aug. 28, 2018

(54) TRAVEL DRIVING APPARATUS OF VEHICLE

(71) Applicant: MITSUBISHI JIDOSHA KOGYO KABUSHIKI KAISHA, Tokyo (JP)

(72) Inventors: Ryo Shimizu, Tokyo (JP); Norihiko Ikoma, Tokyo (JP); Makoto Kamachi, Tokyo (JP); Hironori Abe, Tokyo (JP); Naoki Miyamoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/456,975

(22) Filed: Mar. 13, 2017

(65) Prior Publication Data
US 2017/0282891 A1 Oct. 5, 2017

(30) Foreign Application Priority Data
Mar. 30, 2016 (JP) .................................. 2016-068408

(51) Int. Cl.
*B60W 20/10* (2016.01)
*B60K 6/44* (2007.10)
(Continued)

(52) U.S. Cl.
CPC .............. *B60W 20/10* (2013.01); *B60K 1/02* (2013.01); *B60K 6/44* (2013.01); *B60K 6/442* (2013.01); *B60K 6/448* (2013.01); *B60K 6/52* (2013.01); *B60L 11/02* (2013.01); *B60L 11/1851* (2013.01); *B60L 15/20* (2013.01);
(Continued)

(58) Field of Classification Search
CPC ...... B60W 20/10; B60W 20/15; B60W 30/02; B60W 10/08; B60W 10/06; B60W 2520/125; B60W 2520/16; B60W 2710/06; B60W 2710/083; B60W 2720/403; B60L 15/20; B60L 11/1851; B60L 11/02; B60L 2210/14; B60L 2240/525; B60L 2260/28;
(Continued)

(56) References Cited

U.S. PATENT DOCUMENTS

| 2009/0105924 A1* | 4/2009 | Kamichi ................ B60K 6/365 701/99 |
| 2011/0260667 A1 | 10/2011 | Ramamurthy et al. |
| 2011/0288706 A1 | 11/2011 | Okamura |

FOREIGN PATENT DOCUMENTS

| EP | 2025570 A1 | 2/2009 |
| JP | 2007-325352 A | 12/2007 |

(Continued)

*Primary Examiner* — Yuen H Wong
(74) *Attorney, Agent, or Firm* — Birch, Stewart, Kolasch & Birch, LLP

(57) ABSTRACT

A hybrid vehicle including a front motor for driving front wheels, a rear motor for driving rear wheels, and a step-up converter for stepping-up the voltage from a battery and supplying power to the front motor, in which an engine is started to shift the vehicle from an EV mode into a series mode when the output power of the step-up converter is lower than the required power of the front motor, the hybrid vehicle includes a hybrid control unit which computes maximum output power of the step-up converter and, when the output power of the step-up converter is more than the maximum output power, increases the distribution ratio of the travel driving torque of the rear wheel, thereby increasing the output torque of the rear motor.

18 Claims, 5 Drawing Sheets

(51) Int. Cl.
    *B60K 6/52*     (2007.10)
    *B60L 11/02*     (2006.01)
    *B60L 11/18*     (2006.01)
    *B60L 15/20*     (2006.01)
    *B60K 1/02*     (2006.01)
    *B60K 6/442*     (2007.10)
    *B60K 6/448*     (2007.10)
    *B60W 10/06*     (2006.01)
    *B60W 10/08*     (2006.01)
    *B60W 30/02*     (2012.01)
    *B60W 20/15*     (2016.01)

(52) U.S. Cl.
    CPC ............ *B60W 10/06* (2013.01); *B60W 10/08* (2013.01); *B60W 20/15* (2016.01); *B60W 30/02* (2013.01); *B60L 2210/14* (2013.01); *B60L 2240/525* (2013.01); *B60L 2260/28* (2013.01); *B60W 2520/125* (2013.01); *B60W 2520/16* (2013.01); *B60W 2710/06* (2013.01); *B60W 2710/083* (2013.01); *B60W 2720/403* (2013.01); *Y10S 903/903* (2013.01)

(58) Field of Classification Search
    CPC .......... B60K 6/448; B60K 6/442; B60K 1/02; B60K 6/44; B60K 6/52; Y10S 903/903
    See application file for complete search history.

(56) References Cited

FOREIGN PATENT DOCUMENTS

| | | |
|---|---|---|
| JP | 2014-121961 A | 7/2014 |
| JP | 2014-125053 A | 7/2014 |
| JP | 2014-176168 A | 9/2014 |
| WO | WO 2015/166325 A1 | 11/2015 |

\* cited by examiner

TRAVEL DRIVING APPARATUS OF VEHICLE

BACKGROUND OF THE INVENTION

Field of the Invention

The present invention relates to control of travel driving of a vehicle.

Description of the Related Art

In hybrid vehicles which have been recently developed, there is known a vehicle which is switchable between a traveling mode in which driving wheels for travelling are driven by an electric motor powered by an on-board battery (EV mode) and a traveling mode in which travel driving is performed by the electric motor while power is generated by a generator driven by an internal combustion engine (series mode).

Further, in recent years, there have been developed a hybrid vehicle which includes two electric motors as the travel diving source and a transformer (step-up converter) for stepping up the voltage outputted from an on-board battery.

For example, Japanese Patent Laid-Open No. 2007-325352 discloses a vehicle including an electrically powered front motor for driving the front wheels and an electrically powered rear motor for driving the rear wheels. In the concerned vehicle, the front motor is driven by voltage which is outputted from an on-board battery and stepped up by a transformer. Moreover, the rear motor is driven by voltage outputted from the on-board battery.

Thus, as a result of supplying voltage stepped up by the transformer, travel driving by the front motor is more efficient compared with a travel driving by a rear motor not via a transformer, thus enabling suppression of power consumption.

Meanwhile, in a vehicle which is switchable between an EV mode and a series mode as described above, when the charging rate of the on-board battery decreases or the required power for the electric motor increases in the EV mode in which the vehicle travels with the internal combustion engine being stopped, the internal combustion engine is automatically started to begin power generation, shifting into the series mode.

Moreover, there are upper limits for input and output power for the transformer as described above in view of protecting components from generated heat or the like. Therefore, in a vehicle as described above, a problem exists in that power supply to the front motor may become insufficient in the EV mode, and the internal combustion engine must be driven to add generated power by the generator, thus causing decline in fuel economy.

SUMMARY OF THE INVENTION

Thus, it an objective of the present invention to provide a travel driving apparatus of a vehicle, which suppresses the frequency of starting an internal combustion engine while protecting a transformer in a hybrid vehicle which is provided with an onboard transformer as well as an electrical motor for driving front wheels and an electrical motor for driving rear wheels.

To achieve the above described objective, the travel driving apparatus of a vehicle of the present invention includes: a first electrical motor for driving either one of a front wheel and a rear wheel of the vehicle; a transformer for transforming voltage of power supplied from a battery mounted on the vehicle and supplying power to the first electrical motor, wherein maximum output power is limited based on a temperature condition; a second electrical motor for driving the other one of the front wheel and the rear wheel of the vehicle, the second electrical motor being supplied with power from the battery not via the transformer; an internal combustion engine for driving a generator mounted on the vehicle; a required driving-torque computing section for computing a required travel driving torque of the vehicle; and a distribution ratio computing section for setting a distribution ratio by which the required travel driving torque is distributed into a travel driving torque of the front wheel and a travel driving torque of the rear wheel based on the maximum output power of the transformer when the vehicle is travelling with the internal combustion engine being stopped.

As a result of this, since, in the travel driving apparatus of a vehicle according to the present invention, the distribution ratio between the travel driving torque of the front wheel and that of the rear wheel is set based on a maximum output power of the transformer, it is possible to decrease the frequency of starting the internal combustion engine while protecting the transformer.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, embodiments of the present invention will be described with reference to the drawings.

Figure 1:
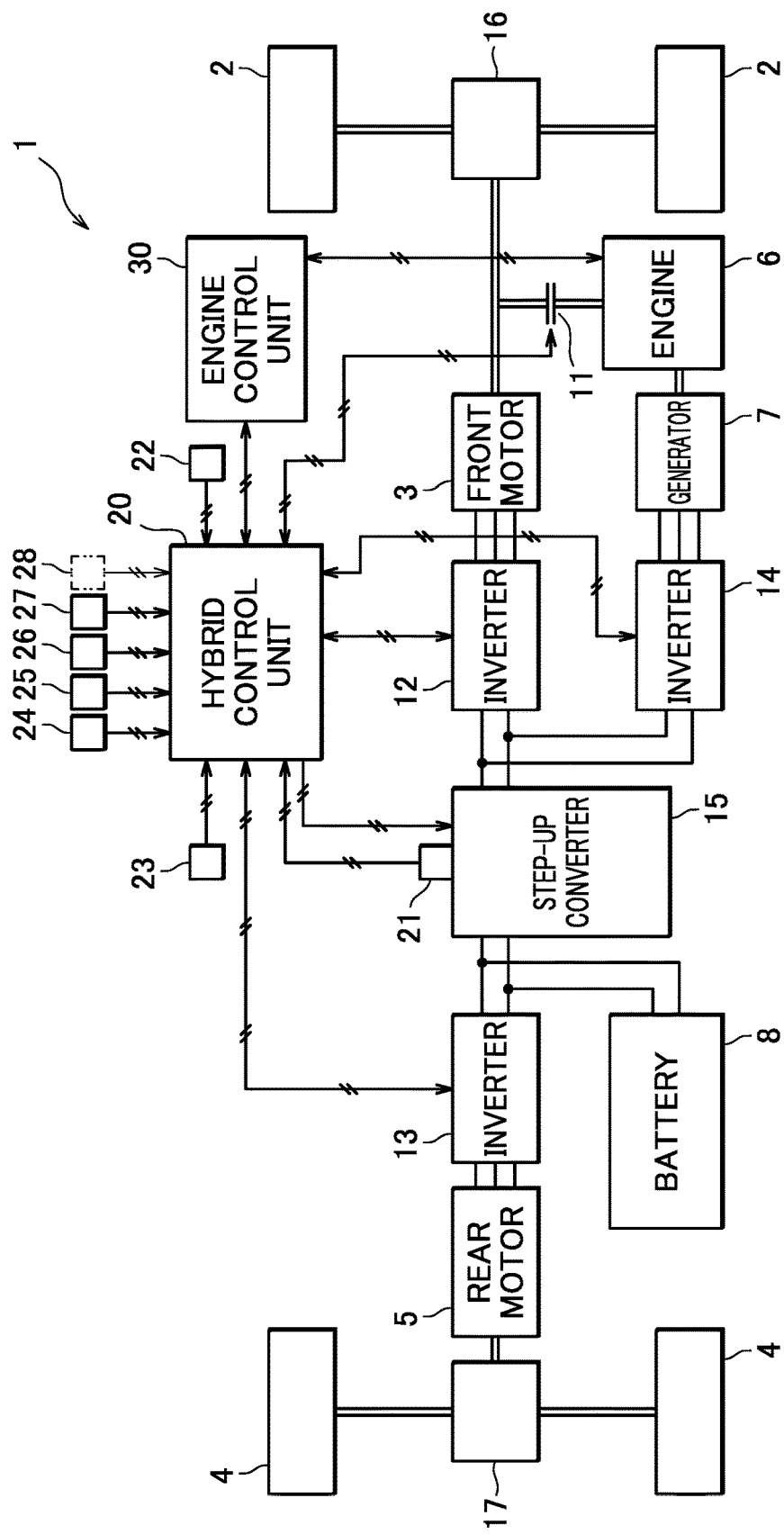
FIG. 1 is a schematic configuration diagram of a travel driving apparatus of a vehicle according to one embodiment of the present invention.

FIG. 1 is a schematic configuration diagram of a travel driving apparatus 1 of a vehicle according to one embodiment of the present invention.

As shown in FIG. 1, a vehicle equipped with the travel driving apparatus 1 of one embodiment of the present invention is a four-wheel drive hybrid vehicle, which is provided with an electrically driven front motor 3 (first electrical motor) for driving front wheels 2, an electrically driven rear motor 5 (second electrical motor) for driving rear wheels 4, an engine 6 (internal combustion engine), a generator 7 (rotary electric machine), and a battery 8.

The engine 6 can drive the front wheels 2 via a front trans-axle 16 and drive the generator 7 to generate power.

Moreover, the engine 6 and the front wheels 2 are configured such that power can be transferred therebetween via a clutch 11.

Moreover, the vehicle is provided with an inverter 12 for controlling power supply to the front motor 3, an inverter 13 for controlling power supply to the rear motor 5, and an inverter 14 for controlling output of the generator 7.

The travel driving apparatus 1 of the present embodiment includes a step-up converter 15 (transformer) which steps up the voltage of the battery 8 and supplies high voltage power to the front motor 3, and at the same time steps down the high voltage power generated by the generator 7 to supply it to the battery 8 and the rear motor 5.

The front motor 3, which can be driven by being supplied with power from the battery 8 via the step-up converter 15 and the inverter 12, and also can be driven by being supplied with power from the generator 7 via the inverter 14 and the inverter 12, drives the front wheels 2 via the front trans-axle 16.

The rear motor 5, which is driven by being supplied with power from the battery 8 via the inverter 13, drives the rear wheel 4 via a rear trans-axle 17.

The power generated by the generator 7 and outputted from the inverter 14 allows charging of the battery 8 via the step-up converter 15, and can also be supplied to the front motor 3 via the inverter 12 and to the rear motor 5 via the inverter 13.

Moreover, the generator 7, which is driven by being supplied with power from the battery 8 via the step-up converter 15 and the inverter 14, has a function as a starter motor for starting the engine 6.

The battery 8, which is made up of a secondary cell battery such as a lithium-ion battery, has a battery module not shown and made up of a plurality of battery cells brought together.

Operation of each of the inverter 12, the inverter 13, the inverter 14, and the step-up converter 15 is controlled by a control signal from a hybrid control unit 20 (a distribution ratio computing section and a starting determination section) mounted on the vehicle.

The step-up converter 15 is provided with a temperature sensor 21 for detecting the temperature of a component (element, etc.) of the step-up converter 15.

Further, the vehicle is provided with a front-wheel rotational frequency sensor 22 for detecting the number of rotation per unit time of the front wheel 2, a rear-wheel rotational frequency sensor 23 for detecting the number of rotation per unit time of the rear wheel 4, an accelerator sensor 24 for detecting an accelerator depression amount, a brake sensor 25 for detecting a brake depression amount, a G sensor 26 (lateral acceleration detector) for detecting longitudinal acceleration and lateral acceleration of the vehicle, a steering angle sensor 27 for detecting a steering control angle (steering angle), and an engine control unit 30 for controlling the driving of the engine 6.

The engine control unit 30 controls the driving of the engine 6 based on a control signal from the hybrid control unit 20.

The hybrid control unit 20, which is a control apparatus for performing comprehensive control of the vehicle, is configured to include an input/output apparatus, a storage apparatus (ROM, RAM, non-volatile RAM, etc.), a central processing unit (CPU), and a timer, etc.

The input side of the hybrid control unit 20 is connected with each of the inverters 12 to 14, the engine control unit 30, the temperature sensor 21, the front-wheel rotational frequency sensor 22, the rear-wheel rotational frequency sensor 23, the accelerator sensor 24, the brake sensor 25, the G sensor 26, and the steering angle sensor 27, and is inputted with detection and operation information from these equipment.

On the other hand, the output side of the hybrid control unit 20 is connected with each of the inverters 12 to 14, the engine control unit 30, and the clutch 11.

Then, the hybrid control unit 20 transmits a control signal to the engine control unit 30, each of the inverters 13 and 14, and the clutch 11 to control the switching of the traveling mode (EV mode, series mode, and parallel mode) which involves engagement and disengagement of the clutch 11, output torques of the engine 6, the front motor 3 and the rear motor 5, and generated power of the generator 7 based on various detection amounts such as accelerator depression amount from the accelerator sensor 24 of the vehicle, and various operation information.

In the parallel mode, the front wheels 2 are mechanically driven by the output of the engine 6 with the clutch 11 being engaged, and are also driven to travel by the front motor 3 and the rear motor 5.

In the EV mode and the series mode, the clutch 11 is disengaged. In the EV mode, the engine 6 is stopped, and the front motor 3 and the rear motor 5 are driven by power from the battery 8. In the series mode, the engine 6 is operated to cause the generator 7 to generate power, thereby supplying power to and driving the front motor 3 and the rear motor 5.

Figure 2:
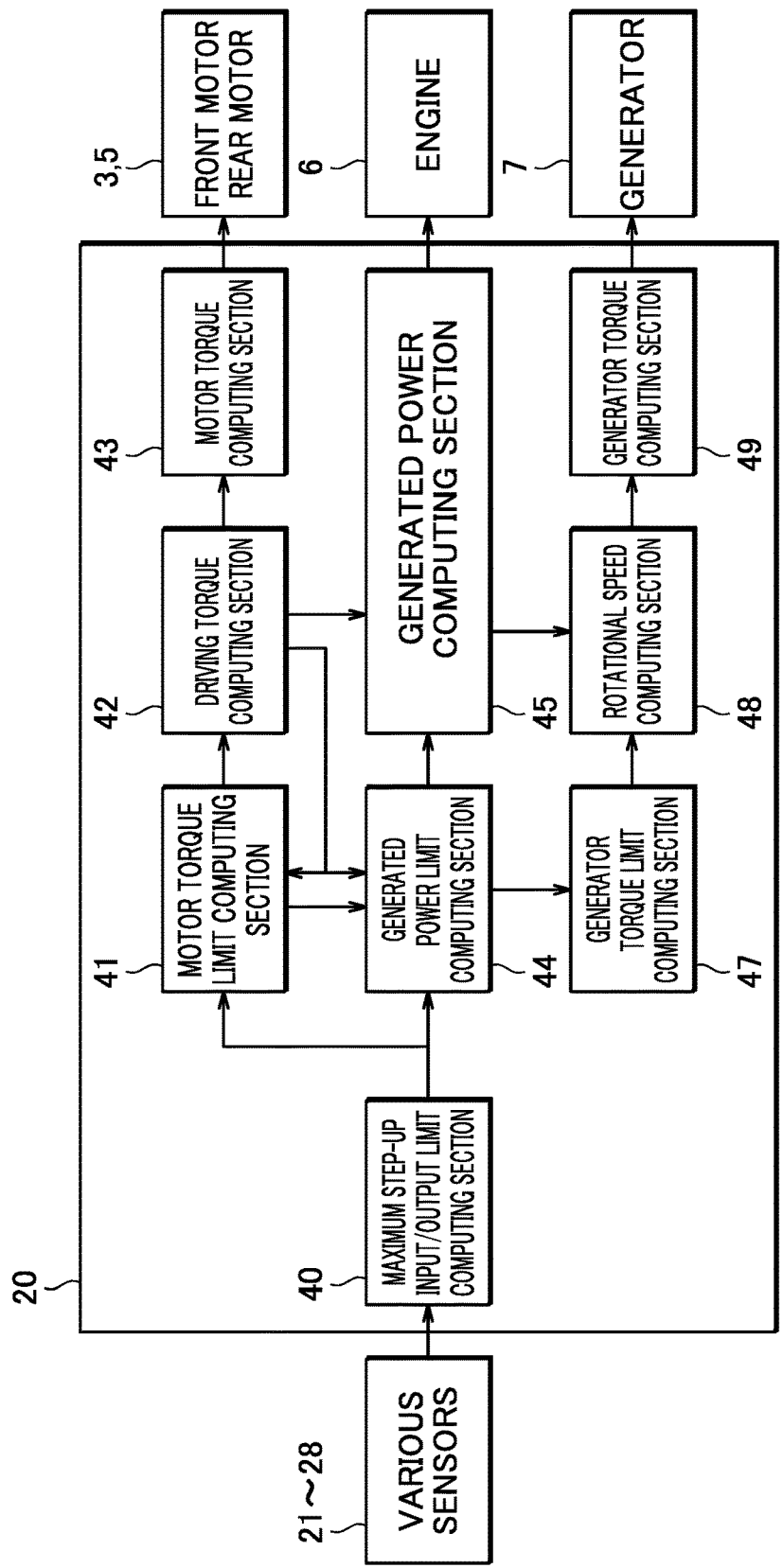
FIG. 2 is a block diagram to show a configuration of a driving control apparatus of the present embodiment.

FIG. 2 is a block diagram to show the configuration of a driving control apparatus of the present embodiment.

As shown in FIG. 2, the hybrid control unit 20 includes a maximum step-up input/output limit computing section 40, a motor torque limit computing section 41, a driving torque computing section 42 (required driving-torque computing section), a motor torque computing section 43, a generated power limit computing section 44, a generated power computing section 45, a generator torque limit computing section 47, a rotational speed computing section 48, and a generator torque computing section 49.

The maximum step-up input/output limit computing section 40 computes a step-up converter upper-limit power Pvmax, which is a maximum value of the input/output power of the step-up converter 15, based on the temperature of the step-up converter 15.

The motor torque limit computing section 41 computes motor maximum torques (Tfmax, Trmax), which are upper limit values of the motor torques (driving torques of the front motor 3 and the rear motor 5), respectively.

The driving torque computing section 42 computes driving torque of the entire vehicle (user-requested driving torque Tur).

The motor torque computing section 43 computes motor torques Tmf, Tmr of the front motor 3 and the rear motor 5. Then, based on these motor torques Tmf, Tmr, it controls the operation of the front motor 3 and the rear motor 5 via the inverters 12, 13.

The generated power limit computing section 44 computes a maximum value of the generated power of the generator 7.

The generated power computing section 45 computes engine power output, which is generated power by the generator 7, which is required corresponding to the user-requested driving torque Tur. Then, based on the engine power output in the generator 7, the operation including starting and stopping of the engine 6 is controlled via the engine control unit 30.

The generator torque limit computing section 47 computes a limiting value of the generator torque.

The rotational speed computing section 48 computes a rotational speed of the generator 7 corresponding to the engine power output.

The generator torque computing section 49 computes a generator torque for achieving the rotational speed of the generator 7 which is computed at the rotational speed computing section 48. Then, based on the generator torque, it controls the generator 7 via the inverter 14.

Next, driving control by the travel driving apparatus 1 of the present embodiment will be described in detail by using FIGS. 3 and 4.

Figure 3:
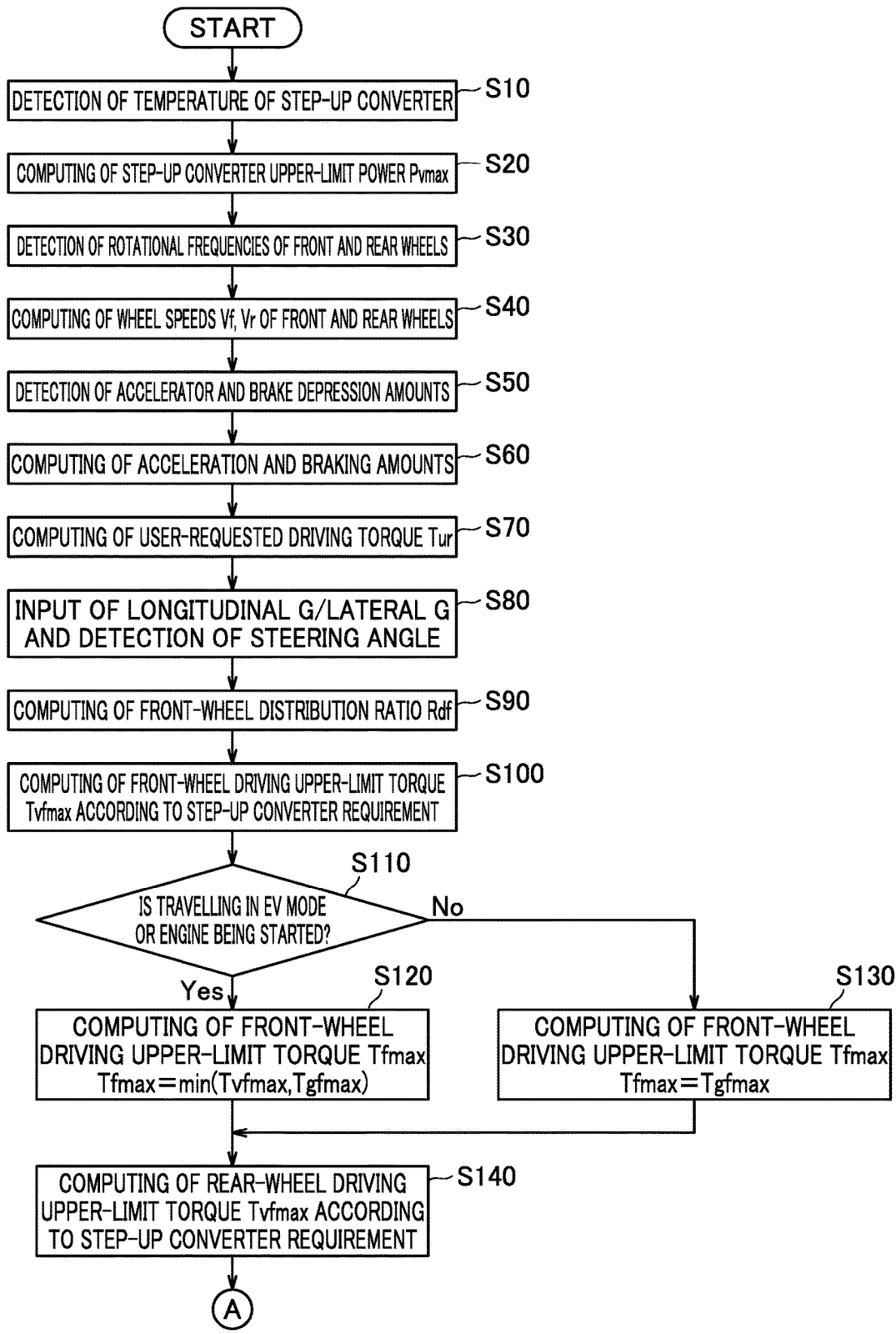
FIG. 3 is a flowchart to show a part of driving control procedure in the travel driving apparatus according to the present embodiment.

FIG. 3 is a part of the flowchart to show the driving control procedure in the travel driving apparatus 1. FIG. 4 is the rest of the flowchart to show the driving control procedure in the travel driving apparatus 1.

Figure 4:
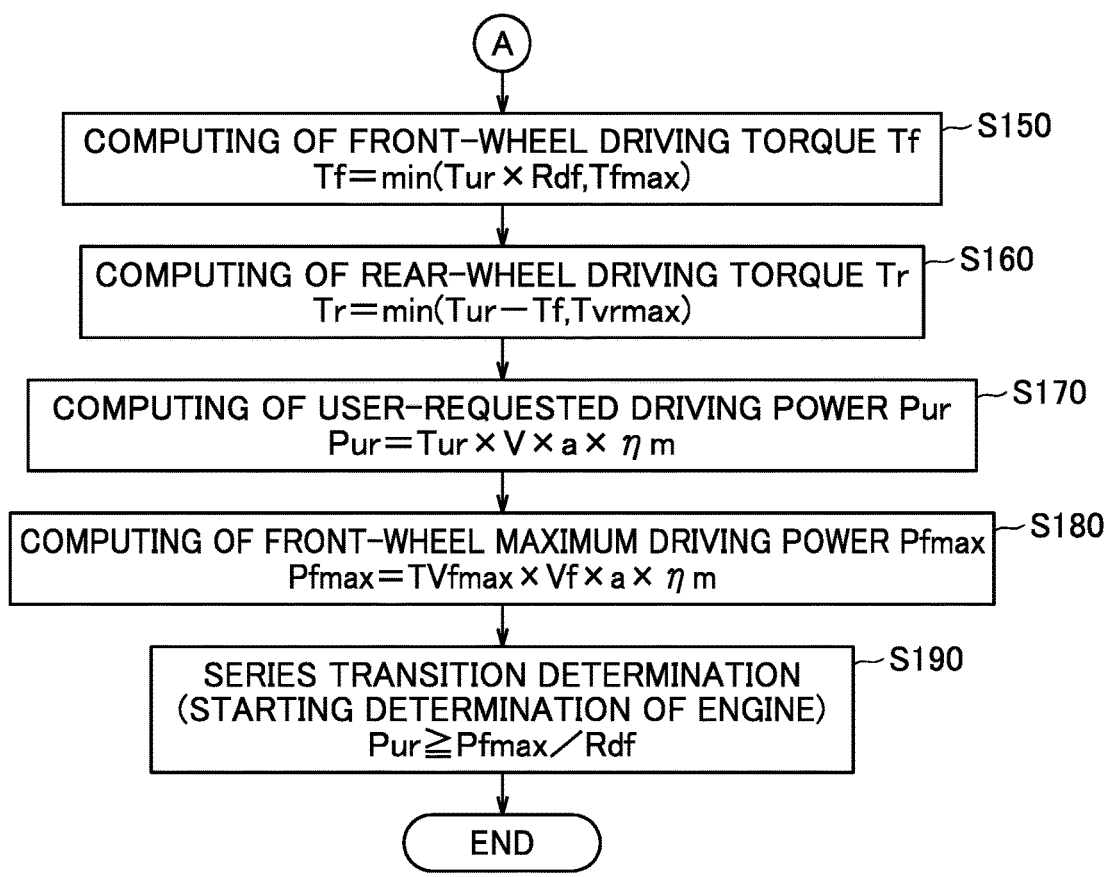
FIG. 4 is a flowchart to show the rest of the driving control procedure in the travel driving apparatus according to the present embodiment.

The hybrid control unit 20 repeatedly executes routines of driving control shown in FIGS. 3 and 4 while the vehicle power supply is turned ON.

First, in step S10, a temperature of the step-up converter 15 is inputted from the temperature sensor 21. Then the process proceeds to step S20.

In step S20, a step-up converter upper-limit power Pvmax is computed based on the temperature of the step-up converter 15 which has been inputted in step S10. The step-up converter upper-limit power Pvmax is maximum output power in the step-up converter 15. The step-up converter upper-limit power Pvmax is computed by using, for example, a pre-stored map, and setting is made such that the step-up converter upper-limit power Pvmax becomes lower as the temperature of the step-up converter 15 becomes higher. Then, the process proceeds to step S30. Note that the control in this step corresponds to the function of the above described maximum step-up input/output limit computing section 40.

In step S30, rotational frequencies of the front wheel 2 and the rear wheel 4 are detected respectively by the front-wheel rotational frequency sensor 22 and the rear-wheel rotational frequency sensor 23, and the concerned rotational frequencies are inputted. Then, the process proceeds to step S40.

In step S40, based on the rotational frequencies of the front wheel 2 and the rear wheel 4 inputted in step S30, wheel speeds V (Vf, Vr) of the front wheel 2 and the rear wheel 4 are computed. Then, the process proceeds to S50.

In step S50, an accelerator depression amount is detected by the accelerator sensor 24 and a brake depression amount is detected by the brake sensor 25 so that the concerned accelerator depression amount and brake depression amount are inputted. Then, the process proceeds to step S60.

In step S60, based on the accelerator and brake depression amounts inputted in step S50, acceleration and braking amounts are computed. Then, the process proceeds to step S70.

In step S70, a user-requested driving torque Tur (required travel driving torque) is computed based on the wheel speeds V computed in step S40 and the acceleration and braking amounts computed in step S60. The user-requested driving torque Tur is a travel driving torque of the entire vehicle which is needed when accelerating/decelerating the vehicle from the current wheel speed V, that is, the travelling speed of the vehicle in correspondence with the acceleration/deceleration instruction of the driver based on the acceleration amount and the braking amount. Then, the process proceeds to step S80. Note that the control of this step corresponds to the function of the above described driving torque computing section 42.

In step S80, a longitudinal acceleration and lateral acceleration of the vehicle are detected by the G sensor 26. Moreover, the steering angle is detected by the steering angle sensor 27. Then, these longitudinal acceleration, lateral acceleration, and steering angle are inputted. Thereafter, the process proceeds to step S90.

In step S90, a front-wheel distribution ratio Rdf (required distribution ratio) is computed based on vehicle travelling conditions such as the longitudinal acceleration, lateral acceleration, and steering angle, inputted in step S80. Note that the front-wheel distribution ratio Rdf (minimum assurance distribution ratio) is set between 100% and 50% in the vehicle of the present embodiment. Then, the process proceeds to step S100. Note that the control of this step corresponds to the distribution ratio computing section of the present invention.

In step S100, a front-wheel driving upper-limit torque Tvfmax according to step-up converter requirement is computed based on the step-up converter upper-limit power Pvmax computed in step S20 and the front wheel speed Vf of the front wheel 2 computed in step S40. The front-wheel driving upper-limit torque Tvfmax according to step-up converter requirement is an upper limit value of torque that the front motor 3 can output within a range not more than the step-up converter upper-limit power Pvmax, and is found by Formula (1) shown below. As shown by Formula (1), the front-wheel driving upper-limit torque Tvfmax according to step-up converter requirement is computed by using a value obtained by subtracting the engine starting power Pes from the step-up converter upper-limit power Pvmax such that engine starting is possible. Since this allows performing control always taking into consideration of the amount of power generation for starting the engine, it is possible to suppress deterioration of drivability when the engine is started. Note that in Formula (1), ηmf is efficiency of the front motor 3.

$$Tvfmax = (Pvmax - Pes) \times \eta mf/Vf/(2\pi/60) \quad (1)$$

Then, the process proceeds to step S110.

In step S110, it is determined whether or not the vehicle is travelling in the EV mode or the engine is being started, that is, whether or not the engine 6 is currently stopped. When the vehicle is travelling in the EV mode or the engine is being started, that is, the engine 6 is currently stopped, the process proceeds to step S120. When the vehicle is not travelling in the EV mode, or the engine is not being started, that is, the engine 6 is currently being operated, the process proceeds to step S130.

In step S120, a front-wheel driving upper-limit torque Tfmax is computed. In this step, the front-wheel driving upper-limit torque Tfmax is found by selecting smaller one of the front-wheel driving upper-limit torque Tvfmax according to step-up converter requirement computed in step S100 and a front-wheel driving upper-limit torque Tgfmax according to another requirement, as shown by Formula (2) below. Note that, the front-wheel driving upper-limit torque Tgfmax according to another requirement is a front-wheel driving torque when outputs of the motor torque and the inverter are limited due to overheating or the like of the front motor 3 and the inverter 12.

$$Tfmax = \min(Tvfmax, Tgfmax) \quad (2)$$

Then, the process proceeds to step S140.

In step S130, a front-wheel driving upper-limit torque Tfmax is computed. In the present step, the front-wheel driving upper-limit torque Tfmax is supposed to be the front-wheel driving upper-limit torque Tgfmax according to another requirement as shown in Formula (3).

$$Tfmax = Tgfmax \quad (3)$$

Then, the process proceeds to step S140.

In step S140, a rear-wheel driving upper-limit torque Tvrmax according to step-up converter requirement is computed. The rear-wheel driving upper-limit torque Tvrmax according to step-up converter requirement is computed based on a front-wheel driving upper-limit torque Tvfmax according to step-up converter requirement computed in step S100 and the front-wheel distribution ratio Rdf (minimum assurance distribution ratio) computed in step S90, as shown by Formula (4) below.

$$Tvrmax = Tvfmax \times (1-Rdf)/Rdf \quad (4)$$

Then, the process proceeds to S150 in FIG. 4.

In step S150, a front-wheel driving torque Tf is computed. The front-wheel driving torque Tf is found by selecting smaller one of a multiplication value of the user-requested driving torque Tur computed in step S70 and the front-wheel distribution ratio Rdf (required) computed in step S90, and the front-wheel driving upper-limit torque Tfmax computed in step S120 or step S130, as shown by Formula (5) below.

$$Tf = min(Tur \times Rdf, Tfmax) \quad (5)$$

Then, the process proceeds to S160.

In step S160, a rear-wheel driving torque Tr is computed. The rear-wheel driving torque Tf is found by selecting smaller one of a value obtained by subtracting the front-wheel driving torque Tf computed in step S150 from the user-requested driving torque Tur computed in step S70, and the rear-wheel driving upper-limit torque Tvrmax according to step-up converter requirement computed in step S140, as shown by Formula (6) below.

$$Tr = min(Tur-Tf, Tvrmax) \quad (6)$$

Then, the process proceeds to S170.

In step S170, a user-requested driving power Pur is computed. The user-requested driving power Pur is found by multiplying the user-requested driving torque Tur computed in step S70 by the wheel speed V computed in step S40 and an overall efficiency ηm of the front motor 3 and the rear motor 5 as shown by Formula (7) below.

$$Pur = Tur \times V \times 2\pi/60/\eta m \quad (7)$$

Then, the process proceeds to S180.

In step S180, a front-wheel maximum driving power Pfmax is computed. The front-wheel maximum driving power Pfmax is found by multiplying the front-wheel driving upper-limit torque Tvfmax according to step-up converter requirement computed in step S100 by the wheel speed Vf of the front wheel computed in step S40 and an efficiency ηmf of the front motor 3, as shown in Formula (8) below.

$$Pfmax = Tvfmax \times Vf \times 2\pi/60/\eta mf \quad (8)$$

Then, the process proceeds to S190.

In step S190, series transition determination is performed. The determination of series transition is determination of shifting from the EV mode to the series mode, and is also determination of engine starting. Specifically, as shown by Formula (9) below, the determination is made based on whether or not the user-requested driving power Pur computed in step S170 is not less than a value obtained by dividing the front-wheel maximum driving power Pfmax computed in step S180 by the front-wheel distribution ratio Rdf (minimum assurance distribution ratio) computed in step S90.

$$Pur \geq Pfmax/Rdf \quad (9)$$

When it is determined that the user-requested driving power Pur is not less than a value obtained by dividing the front-wheel maximum driving power Pfmax by the front-wheel distribution ratio Rdf, shifting to the series mode in which the engine is started is determined. When it is determined that the user-requested driving power Pur is less than a value obtained by dividing the front-wheel maximum driving power Pfmax by the front-wheel distribution ratio Rdf, the EV mode is continued without starting the engine 6. Note that the control of the present step corresponds to the starting determination section of the present invention. Then, this routine is ended.

Through the above described control, the front-wheel driving torque Tf and the rear-wheel driving torque Tr are found. Then, the hybrid control unit 20 controls the output of the front motor 3 based on the front-wheel driving torque Tf and controls the output of the rear motor 5 based on the rear-wheel driving torque Tr. Further, the hybrid control unit 20 performs starting control of the engine 6 with the generator 7 being the starter motor, and fuel injection and ignition control of the engine 6 via the engine control unit 30 to start the engine 6, according to determination of series transition.

The vehicle of the present embodiment is a four-wheel drive vehicle in which the front wheel 2 can be driven by the front motor 3 and the rear wheel 4 can be driven by the rear motor 5, and in which power is supplied to the rear motor 5 and the front motor 3 from the battery 8 during the EV mode. As described above, output torques of the front motor 3 and the rear motor 5 are controlled by the hybrid control unit 20, and the torque ratio between the front and rear wheels is set based on an operational condition of the vehicle.

Further, the vehicle is mounted with the step-up converter 15 and is configured such that the front motor 3 is supplied with and driven by power which is supplied from the battery 8 and is stepped up in voltage by the step-up converter 15 so that travel driving of the front motor 3 is more efficient than that of the rear motor 5.

Then, in the present embodiment, in the driving control as shown above in FIGS. 3 and 4, the step-up converter upper-limit power Pvmax is computed by detecting the temperature of the step-up converter 15, and the front-wheel driving upper-limit torque Tfmax is set so as not to be more than the front-wheel driving upper-limit torque Tvfmax which is limited by the step-up converter upper-limit power Pvmax, thereafter performing drive limiting control for limiting the front-wheel driving torque Tf. Then, after the front-wheel driving torque Tf is preferentially set based on the limitation of the step-up converter 15, the rear-wheel driving torque Tr is computed.

Figure 5:
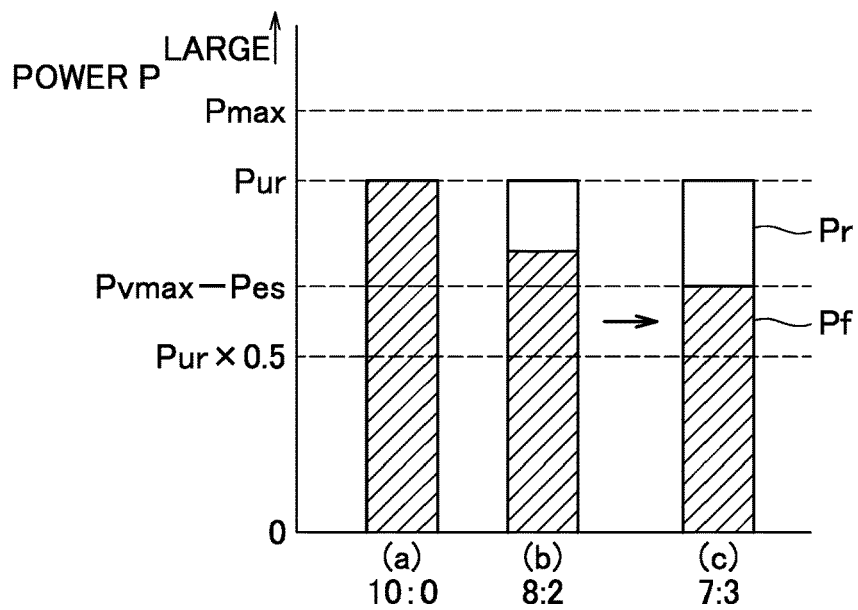
FIG. 5 is a graph to show an example of the front-rear power distribution state during the EV mode.

FIG. 5 is a graph to show an example of the power distribution state between the front and the rear during the EV mode. In FIG. 5, (a) indicates that a front-rear wheel distribution ratio is 10:0, (b) indicates that the front-rear wheel distribution ratio is 8:2, and (a) and (b) indicate the front-wheel driving power Pf and the rear-wheel driving power Pr before the drive limiting control is performed. In FIG. 5, (c) indicates the front-wheel driving power Pf and the rear-wheel driving power Pr when the drive limiting control is performed from the state of (a) or (b), in which the front-rear wheel distribution ratio is, for example, 7:3. Note that in FIG. 5, a shaded section indicates the front-wheel driving power Pf, and a plain portion indicates the rear-wheel driving power Pr.

As shown by (a) and (b) in FIG. 5, in the EV mode in which the engine 6 is in a stopped state, when, for example, the front-rear wheel distribution ratio is 10:0 or 8:2 based on an operational condition, the front-wheel driving power Pf is more than a value obtained by subtracting the engine starting power Pes from the step-up converter upper-limit power Pvmax so that it is not possible to supply power necessary for the front motor 3. Therefore, if the above described drive limiting control is not performed, the engine 6 must be started to supply power generated by the generator 7 to the front motor 3 to ensure the user-requested driving power Pur.

In contrast to this, in the present embodiment, as shown in (c), for example, the front-rear wheel distribution ratio is decreased to 7:3 (the front-wheel distribution ratio Rdf is 0.7), that is, changed from the required distribution ratio (10:0 or 8:2) to a executable distribution ratio (7:3), thereby reducing the front-wheel driving power Pf to a value obtained by subtracting the engine starting power Pes from the step-up converter upper-limit power Pvmax so that the decrement is switched over to the rear-wheel driving power Pr. Therefore, it is possible to ensure the user-requested driving power Pur without operating the engine 6.

Figure 6:
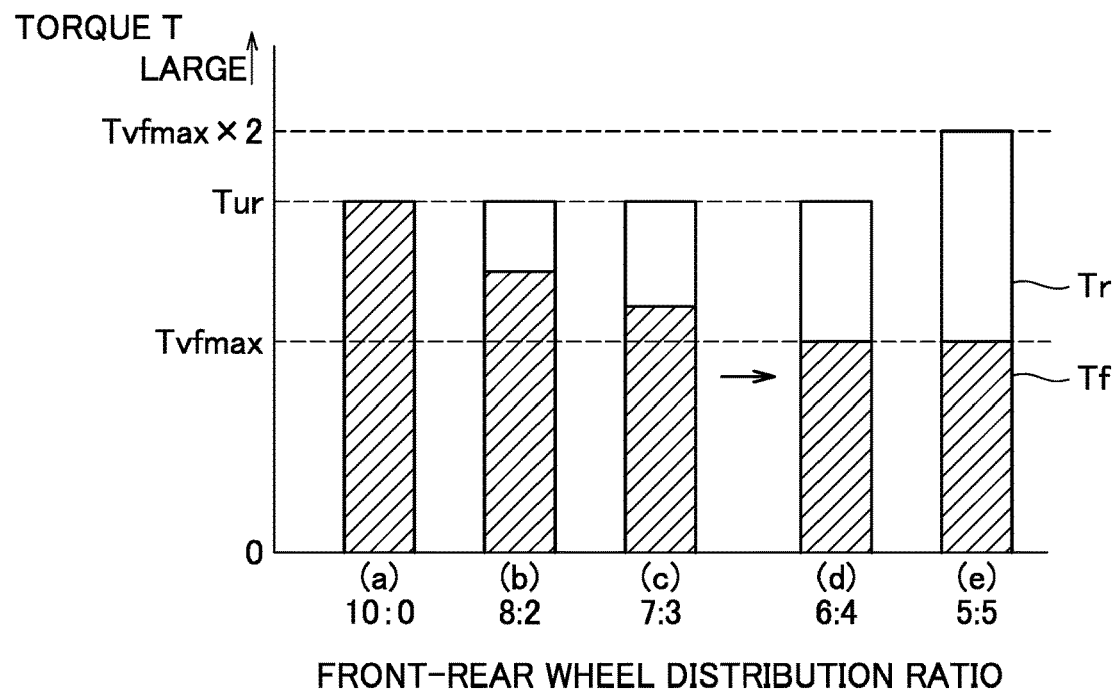
FIG. 6 is a graph to show an example of the front-rear driving torque distribution state during the EV mode.

FIG. 6 is a graph to show an example of the front-rear driving torque distribution state during the EV mode. In FIG. 6, (a) indicates a front-rear wheel distribution ratio of 10:0, (b) indicates a front-rear wheel distribution ratio of 8:2, and (c) indicates a front-rear wheel distribution ratio of 7:3. Further, (a) to (c) indicate the front-wheel driving torque Tf and the rear-wheel driving torque Tr before the drive limiting control is performed. In FIG. 6, (d) indicates the front-wheel driving torque Tf and the rear-wheel driving torque Tr when the drive limiting control is performed from any of the states of (a) to (c), in which the front-rear wheel distribution ratio becomes, for example, 6:4. In FIG. 6, (e) indicates the front-wheel driving torque Tf and the rear-wheel driving torque Tr at the time of a maximum output torque during the EV mode, in which the front-rear wheel distribution ratio (minimum assurance distribution ratio) becomes 5:5.

As shown by (a) to (c) in FIG. 6, when for example the front-rear wheel distribution ratio is 10:0, or 8:2, or 7:3 based on the operational condition during the EV mode, since the front-wheel driving torque Tf is more than the front-wheel driving upper-limit torque Tvfmax according to step-up converter requirement, it is necessary to start the engine 6 for achieving the concerned front-wheel driving torque Tf, thereby supplying power from the generator 7 to the front motor 3.

In contrast to this, in the present embodiment, the front-rear wheel distribution ratio is decreased to, for example, 6:4 as shown by (d), thereby decreasing the front-wheel driving torque Tf to the front-wheel driving upper-limit torque Tvfmax according to step-up converter requirement, and in turn increasing the rear-wheel driving torque Tr so as to satisfy the user-requested driving torque Tur.

In this way, in the present embodiment, during the EV mode in which the engine 6 is stopped, when the front-wheel driving power Pf is more than a value obtained by subtracting the engine starting power Pes from the step-up converter upper-limit power Pvmax, in other words, in an operational condition in which the front-wheel driving torque Tf is more than the front-wheel driving upper-limit torque Tvfmax according to step-up converter requirement, it is possible to keep the front-wheel driving torque Tf to be not more than the front-wheel driving upper-limit torque Tvfmax according to step-up converter requirement by changing the front-rear wheel distribution ratio (front-wheel distribution ratio Rdf) such that the front-wheel driving torque Tf is decreased and the rear-wheel driving torque Tr is increased.

As a result of this, it is possible to suppress the frequency of starting the engine 6, thereby improving fuel economy, while satisfying the user-requested driving power Pur and ensuring the user-requested driving torque Tur.

Moreover, by adjusting the front-wheel driving torque Tf to be the front-wheel driving upper-limit torque Tvfmax according to step-up converter requirement, it is possible to increase the front-wheel driving torque Tf as much as possible within a range of not starting the engine and make best use of driving by the front motor 3, which is more efficient than the rear motor 5, thereby suppressing power consumption.

Moreover, since it is restricted that the rear-wheel driving torque Tr increases to a front-rear wheel distribution ratio of 5:5 or more, i.e., that the maximum value Rdrmax (predetermined maximum distribution ratio) of the rear-wheel distribution ratio Rdr (=1−Rdf) is 0.5, even if drive limiting control to limit the front-wheel driving torque Tf is performed as described above, it is possible to suppress excessive decrease of the front-wheel driving torque Tf, thereby ensuring vehicle travelling stability.

Further, the hybrid control unit 20 may change the maximum value Rdrmax of the rear-wheel distribution ratio based on the operational condition. For example, the maximum value Rdrmax of the rear-wheel distribution ratio may be increased during straight travelling to more than that during turning travelling. Since straight travelling is advantageous in the aspect of vehicle travelling stability, the front-wheel driving torque Tf can be significantly decreased by increasing the maximum value Rdrmax, making it possible to further reduce the starting frequency of the engine 6, further improving fuel economy.

Moreover, the maximum value Rdmax of the rear-wheel distribution ratio may be changed depending on the lateral acceleration detected by the G sensor 26. For example, the maximum value Rdrmax may be decreased as lateral acceleration increases. Alternatively, a tilting angle sensor 28 (tilting angle detector) may be provided in the vehicle, and the maximum value Rdrmax may be decreased during downhill travelling. In a situation in which the vehicle travelling stability deteriorates, such as while the lateral acceleration increases, and during downhill travelling, it is possible to improve the vehicle travelling stability by decreasing the maximum value Rdrmax of the rear-wheel distribution ratio, thereby suppressing decrease of the front-wheel driving torque Tf.

Note that the present invention will not be limited to the above described embodiments. For example, when the above described drive limiting control is performed, the rear-wheel distribution ratio Rdr may be increased to be at least more than that of a case in which the drive limiting control is not performed. The maximum value Rdrmax of the rear-wheel distribution ratio may be constant such as 5:5, or may be changed based on information relating to the vehicle travelling stability, other than lateral acceleration or the like. The present invention may be widely applicable to a four-wheel drive hybrid vehicle, of which operation can be switched between an EV mode and a series mode, which includes an electrical motor for driving the front wheels and an electrical motor for driving the rear wheels, and which is equipped with a step-up converter.

What is claimed is:

1. A travel driving apparatus of a vehicle, comprising:
a first electrical motor for driving either one of a front wheel and a rear wheel of the vehicle;
a transformer for transforming voltage of power supplied from a battery mounted on the vehicle and supplying power to the first electrical motor, wherein maximum output power is limited based on a temperature condition of the transformer;
a second electrical motor for driving the other one of the front and rear wheels of the vehicle, the second electrical motor being supplied with power from the battery not via the transformer;
an internal combustion engine for driving a generator mounted on the vehicle;
a hybrid control device for computing a required travel driving torque of the vehicle; and
an engine control device for controlling starting and stopping of the internal combustion engine by setting a distribution ratio by which the required travel driving torque is distributed into a travel driving torque of the front wheel and a travel driving torque of the rear wheel based on the maximum output power of the transformer when the internal combustion engine driving the vehicle is stopped.

2. The travel driving apparatus of a vehicle according to claim 1, wherein
the internal combustion engine mounted on the vehicle drives the one of the wheels,
the generator starts the internal combustion engine with power supplied from the battery via the transformer and, on the other hand, supplying power generated by the internal combustion engine to the battery via the transformer, and
the engine control device sets the distribution ratio based on power obtained by subtracting power of the generator needed for starting the internal combustion engine from the maximum output power.

3. The travel driving apparatus of a vehicle according to claim 2, wherein
the engine control device performs starting determination of the internal combustion engine based on the required travel driving torque and the distribution ratio, and
starts the internal combustion engine to begin power generation at the generator upon judging that the distribution ratio is not capable to be achieved.

4. The travel driving apparatus of the vehicle according to claim 3, wherein
the engine control device restricts the distribution ratio of the travel driving torque of the rear wheel to be not more than a predetermined maximum distribution ratio.

5. The travel driving apparatus of the vehicle according to claim 4, wherein
the engine control device changes the predetermined maximum distribution ratio based on an operational condition of the vehicle.

6. The travel driving apparatus of the vehicle according to claim 5, wherein
the engine control device increases the predetermined maximum distribution ratio during straight travelling of the vehicle to more than the predetermined maximum distribution ratio during turning travelling of the vehicle.

7. The travel driving apparatus of the vehicle according to claim 5, wherein
a sensor for detecting lateral acceleration is provided in the vehicle, and
the engine control device decreases the predetermined maximum distribution ratio as the lateral acceleration increases.

8. The travel driving apparatus of the vehicle according to claim 5, wherein
a tilting angle sensor for detecting a forward tilting angle is provided in the vehicle, and
the engine control device increases driving torque to be distributed to the rear wheels as the forward tilting angle on an ascending gradient increases.

9. The travel driving apparatus of the vehicle according to claim 2, wherein
the engine control device restricts the distribution ratio of the travel driving torque of the rear wheel to be not more than a predetermined maximum distribution ratio.

10. The travel driving apparatus of the vehicle according to claim 9, wherein
the engine control device changes the predetermined maximum distribution ratio based on an operational condition of the vehicle.

11. The travel driving apparatus of the vehicle according to claim 10, wherein
the engine control device increases the predetermined maximum distribution ratio during straight travelling of the vehicle to more than the predetermined maximum distribution ratio during turning travelling of the vehicle.

12. The travel driving apparatus of the vehicle according to claim 10, wherein
a sensor for detecting lateral acceleration is provided in the vehicle, and
the engine control device decreases the predetermined maximum distribution ratio as the lateral acceleration increases.

13. The travel driving apparatus of the vehicle according to claim 10, wherein
a tilting angle sensor for detecting a forward tilting angle is provided in the vehicle, and
the engine control device increases driving torque to be distributed to the rear wheels as the forward tilting angle on an ascending gradient increases.

14. The travel driving apparatus of the vehicle according to claim 1, wherein
the engine control device restricts the distribution ratio of the travel driving torque of the rear wheel to be not more than a predetermined maximum distribution ratio.

15. The travel driving apparatus of the vehicle according to claim 14, wherein
the engine control device changes the predetermined maximum distribution ratio based on an operational condition of the vehicle.

16. The travel driving apparatus of the vehicle according to claim 15, wherein
the engine control device increases the predetermined maximum distribution ratio during straight travelling of the vehicle to more than the predetermined maximum distribution ratio during turning travelling of the vehicle.

17. The travel driving apparatus of the vehicle according to claim 15, wherein
a sensor for detecting lateral acceleration is provided in the vehicle, and
the engine control device decreases the predetermined maximum distribution ratio as the lateral acceleration increases.

18. The travel driving apparatus of the vehicle according to claim 15, wherein a tilting angle sensor for detecting a forward tilting angle is provided in the vehicle, and the engine control device increases driving torque to be distributed to the rear wheels as the forward tilting angle on an ascending gradient increases.

\* \* \* \* \*